Nov. 17, 1970 W. M. AUSTIN 3,541,234

VIDEO CIRCUITS EMPLOYING CASCODED COMBINATIONS OF FIELD EFFECT TRANSISTORS WITH HIGH VOLTAGE, LOW BANDWIDTH BIPOLAR TRANSISTORS

Filed Oct. 20, 1967 2 Sheets-Sheet 1

INVENTOR
Wayne M. Austin

BY William H. Meagher
ATTORNEY

INVENTOR
Wayne M. Austin

BY William H. Meagher
ATTORNEY

United States Patent Office 3,541,234

Patented Nov. 17, 1970

3,541,234

VIDEO CIRCUITS EMPLOYING CASCODED COMBINATIONS OF FIELD EFFECT TRANSISTORS WITH HIGH VOLTAGE, LOW BANDWIDTH BIPOLAR TRANSISTORS

Wayne Miller Austin, Flemington, N.J., assignor to RCA Corporation, a corporation of Delaware Filed Oct. 20, 1967, Ser. No. 676,887
Int. Cl. H03f *3/16;* H04n *5/60, 9/52*
U.S. Cl. 178—5.4 6 Claims

ABSTRACT OF THE DISCLOSURE

There is disclosed a circuit capable of exhibiting large output voltage swings over a broad band of frequencies. A high voltage and large dissipation rated bipolar transistor has its emitter electrode coupled to the drain electrode of a low voltage rated, but a high gain-bandwidth, field effect device. The coupling is such that, in combination with proper biasing of the devices, the bipolar transistor assumes most of the required output voltage swing while a relatively small voltage swing is developed across the field effect device. The field effect device serves to drive the bipolar over a broad range of frequencies due to the field effect's large gain bandwidth product, while the high voltage swing and consequent dissipation is assumed by the bipolar. The field effect device's gate electrode is coupled to the source of video signals and presents a high impedance thereto. Therefore the circuit applications of the disclosed amplifier are numerous and especially applicable in the field of television receivers.

BACKGROUND OF INVENTION

This invention relates to video circuits and more particularly to video processing circuitry useful in color television receivers.

With the present trend leaning towards the design of semiconductor circuitry for operation in a television receiver, perhaps one of the most difficult problems facing the designer is the circuitry needed to supply the video drive requirements of the typical kinescope.

In this respect the tri-gun color kinescope, by its design and voltage specifications poses the most stringent video signal drive requirements.

In any case, the problem of high gain, high frequency operation of a video circuit has been analyzed and investigated extensively in the prior art. Essentially the problem is viewed in prior art attempts by indicating that such a device or circuit as a video amplifier, can be considered to have a constant gain-bandwidth product, and if a wide bandwidth is desired there is a consequential decrease in gain and vice-versa.

This relation, developed for vacuum tube devices, applies as well for semiconductor devices. Presently as better semiconductor components, such as transistors, are developed there has been appearing higher gain, higher frequency transistor amplifiers. In this manner transistors have been slowly replacing vacuum tubes in many video applications.

However in spite of the progress, one finds that in certain applications, especially as evidenced by color television video requirements, the transistor has yet to replace the vacuum tube. The reason is that for such applications while a transistor circuit may possess the gain and the bandwidth it cannot furnish the required voltage drive. Essentially high voltage operation is incompatible with high frequency operation as the junctions of a transistor need to be wide to accommodate the high voltage and narrow to react to the high frequency.

Therefore certain "so-called" transistorized television receivers employ vacuum tubes in video operations. Others use transistor stacking techniques to accommodate the high voltage requirements. See, for example, an article entitled "Using Low Voltage Transistors in High Voltage Circuits in Electronic Design," vol. 12, No. 14, July 6, 1964, part I, pp. 24–28, part II, July 20, 1964, pp. 62–68. This approach operates but does not economically or otherwise lend itself to high frequency operation as the number of high frequency transistors that would have to be stacked to obtain the required swing and bandwidth would be prohibitive. Another approach, of course, is to use a transistor device capable of providing the requirements by itself. If one makes a simple but practical analysis of data for the video transistors that are presently available, it will be found that no such device is yet available to replace the electron tubes now used as picture tube drivers.

Still another approach, which has been proven feasible, is to use an output stage arrangement involving a pair of transistors in a circuit relation permitting division of the stringent requirements between the transistors, so that relatively low cost, state of the art devices may be employed. Pursuant to this technique a video output stage may comprise a high voltage, high dissipation, rated transistor with its emitter-collector path in series with the emitter-collector path of a low voltage, high gain-bandwidth product rated transistor. The low voltage transistor operates as a common emitter amplifier, driving the emitter of the high voltage transistor, with the base of the latter maintained at a fixed, low potential. See, for example, an article entitled "A Developmental 15-Inch Transistorized Color Receiver" by W. E. Babock in the I.E.E.E. Transactions on Broadcast and Television Receivers, vol. BTR–12, No. 3, July 1966, pp.127–140. (Note especially FIG. 11.) However, such a circuit has a relatively low input impedance when looking into the input of the low voltage transistor and this will load the video circuitry coupled thereto, as, for example, the video detector, and hence this circuit usually requires an additional emitter follower (or common cathode amplifier) as a driver. Therefore the circuit described above, actually, in most instances requires three transistors for suitable operation.

BRIEF DESCRIPTION OF PREFERRED EMBODIMENT

The disadvantages of the prior art devices are circumvented in the present invention by employing a high voltage, high dissipation, high breakdown voltage rated transistor with its emitter-collector path in series with the drain-source path of a low voltage, high gain-bandwidth product rated field effect transistor, which serves to drive the emitter of the high voltage transistor, with the base of the latter maintained at a fixed low potential.

In this manner a large voltage excusion is obtainable at the collector of the high voltage transistor. This in turn, assures breakdown protection and provides the required high dissipation capability; but, in view of its mode of operation, a high gain-bandwidth product rating is not required of this output unit. This allows one to use an inexpensive and readily available transistor to perform this high voltage function. Furthermore, this alleviates the burden of the field effect transistor by freeing it from high voltage and dissipation requirements. Hence all one need use is a field effect device capable of high frequency operation with low voltage and dissipation requirements. Such devices are readily available and can be satisfied by a variety of inexpensive devices.

Furthermore, the circuit described above has a high input impedance which is uniform over a wide range of frequencies, thereby allowing one to couple its gate electrode to a wide range of video sources with varying magnitudes of output impedances.

DETAILED DESCRIPTION

Figure 1:
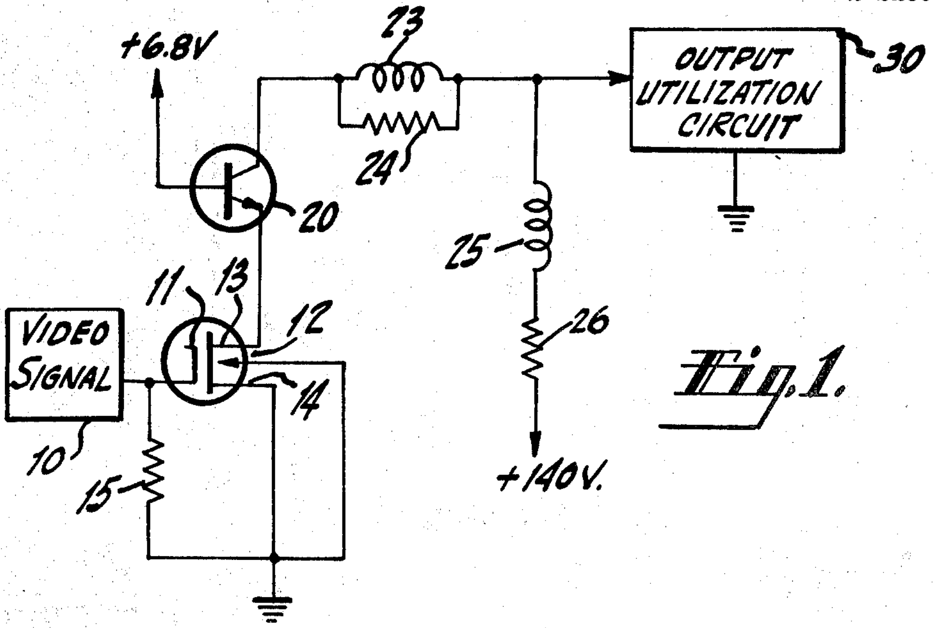
FIG. 1 illustrates, one embodiment, in schematic and block diagram form, of a video signal processing circuit in accordance with this invention.

Referring now to FIG. 1, there is shown a source of video signals 10. The source 10 may, for example, be the video detector portion of a color or black and white receiver, whose video information is obtained by the detector responding to modulated information contained in the intermediate frequency or I.F. video signal present in the receiver.

The output of the video signal source 10 is shown coupled to the gate electrode 11 of a field effect for F.E.T. transistor 12. The gate electrode 11 is also returned to a source of reference potential as ground via the input resistor 15. The source electrode 14 of the F.E.T. 12 is also shown coupled to ground, although one may insert a degenerative resistor returning the source electrode to ground to provide source bias as is known in the art. The drain electrode 13 of the F.E.T. 12 is directly coupled to the emitter electrode of a bipolar transistor 20. The base of the bipolar transistor 20 is returned to a suitable source of potential which biases it for class "A" operation. The collector electrode of the bipolar transistor is returned to a high voltage source, indicated, by way of example, as +140 v., through a series network comprising the shunt combination of inductor 23 with resistor 24 in series with inductor 25 and load resistor 26. The junction between the shunt network formed by resistor 24 and inductor 23 and the series path of inductor 25 and resistor 26 is coupled to the output utilization circuit 30. Output circuit 30, as will be described in detail subsequently, may be a color or black and white kinescope or some other circuit requiring large voltage excursions or swings and wide bandwidth signals.

The field effect transistor 12, shown in FIG. 1, drives the bipolar transistor 20's emitter from the F.E.T. drain electrode 13. Assume the video signal source 10 supplies the luminance signal or Y signal to the gate electrode 11 of the F.E.T. 12. The input impedance of the F.E.T. 12 at the gate electrode 11 is very high and hence does not load the source 10 to any appreciable extent. As the F.E.T. 12 may be of the insulated gate or junction gate type the input impedance of the device, without any resistor terminations at the gate electrode 11, may be of the order of $10^{10}$ to $10^{15}$ ohms. See "The Field Effect Transistor," Electronics, McGraw-Hill Publication, Nov. 30, 1964, pp. 46–49. Hence the circuit shown has an input impedance which is primarily determined by the magnitude of resistor 15 as the resistive input impedance of the F.E.T. 12 can be considered to be infinite for most practical design applications. This, of course, enables one to couple the amplifier shown in the figure to any type of video signal source without any appreciable loading thereof, except for device input capacitance.

Coupled with this characteristic is the high frequency capability of the F.E.T. Devices with a figure of merit between 700 and 900 mHz. or higher, are available and common (see "The Field Effect Transistor as a High-Frequency Amplifier," Electronics, McGraw-Hill, Dec. 14, 1964, pp. 71–74). For such a high frequency F.E.T., the voltage ratings of the device are relatively low, therefore if one uses the F.E.T. 12 as shown, to drive the emitter of the bipolar transistor 20, and allows transistor 20 to furnish the voltage swing and handle the dissipation, the combination provides a wideband, high voltage swing at the collector electrode of transistor 20 or in the case of FIG. 1 at the input to the utilization circuit 30.

Therefore by virtue of the circuit arrangement of the invention, only the bipolar transistor 20 need possess high breakdown voltage and high dissipation ratings; transistor 12 may comprise a high gain-bandwidth product field effect device which possesses substantially lower voltage and dissipation ratings and as such is eaily available. Moreover the F.E.T. 12 offer a high input impedance allowing the circuit to be coupled to a suitable video source as 10, without causing any appreciable loading of the video source. For further bandwidth improvements series and shunt peaking are utilized in the collector circuit of the bipolar transistor 20, in form of the series network comprising the series peaking coil 23 shunted by the damping resistor 24, and the shunt coil 25 in series with the load resistor 26.

Figure 2:
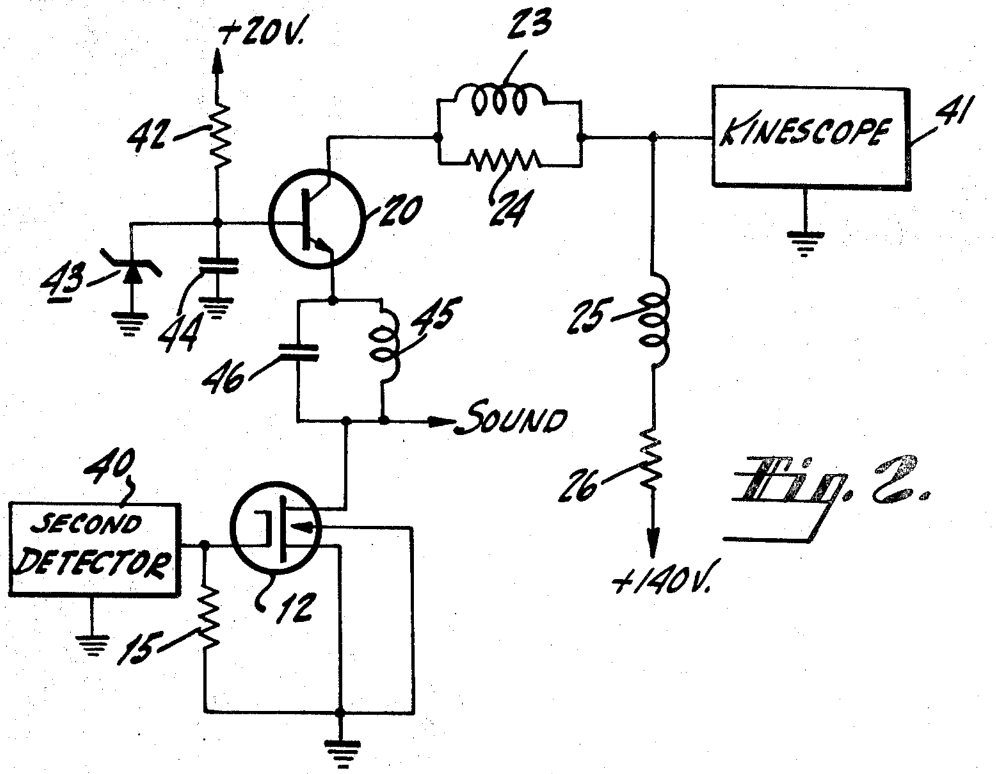
FIG. 2 is a partial block and schematic diagram of a video amplifier operating according to the principles of this invention.

If reference is made to FIG. 2 there is shown a circuit which may be employed as a video amplifier in a black and white television receiver. For the sake of clarity identical numerals have been retained in FIG. 2 to represent identical components previously described in connection with FIG. 1.

Numeral 40 represents the second detector in the television set, whose output is coupled to the high input impedance gate of the F.E.T. 12. The F.E.T. 12, in this case, drives the emitted electrode of the bipolar transistor 20 via a trap circuit comprising the shunt combination of inductor 45 and capacitor 46. This shunt trap serves to remove the sound carrier from the composite video signal and hence is designed to resonate at 4.5 mHz. The very low emitter impedance presented by transistor 20 serves as an effective bypass for the tuned trap and allows sound carrier with gain to be taken from the drain electrode side of the F.E.T. 12. The video signal coupled to the gate of the F.E.T. 12 causes the F.E.T. 12 to drive the emitter of the bipolar transistor 20. The base of the bipolar 20 is biased from a positive twenty volt source which is coupled to one terminal of a resistor 42. The other terminal of resistor 42 is coupled to the base electrode of transistor 20 and to one terminal of a shunt combination of a Zener diode 43 and bypass capacitors 44, whose other terminals are coupled to a point of reference potential such as ground. The voltage drop across the Zener 43 remains at a constant 6.8 volts thus providing proper bias for the bipolar transistor 20. Coupled to the collector of the bipolar transistor is a series peaking coil 23 shunted by a damping resistor 24. This combination serves to enhance the high frequency response of the circuit by compensating for stray circuit capacity. The load resistor 26 is shown coupled at one end to a high voltage D.C. source which is, by way of example, +140 volts. The other terminal of the load resistor 26 is connected to a shunt coil 25 also used for video peaking. The opposite end of the coil 25 is connected to one terminal of the series peaking circuit comprising inductor 23 in shunt with resistor 24 and this junction formed is coupled to an input of a kinescope 41. The input to the kinescope 41 may be the cathode or grid of the kinescope and hence the circuit shown, for a television receiver, has to be capable of high frequency and high voltage drive. It is especially noted that the F.E.T. 12 need only have a large gain bandwidth product and low voltage ratings and be used in the combination described to drive the high dissipation and voltage rated bipolar transistor 20. In fact certain F.E.T.'s as metal on silicon devices, or MOS F.E.T.'s can be fabricated to have gms in excess of 50,000 micromhos but at low voltage ratings (less than 10 volts) and still be used in this invention. An amplifier as shown in FIG. 2 operated with a voltage gain in excess of 50 while further providing a bandwidth in excess of 3.0 mHz. with a voltage swing in excess of 120 volts, using the following components.

F.E.T. 12—3N128
Transistor 20—RCA 40354
Inductor 45—Miller coil #4205
Inductors 23 and 25—Miller coil #4208
Resistor 26—5600 ohms-2 w.
Resistor 15—5600 ohms
Resistor 24—33 kilohms
Diode 43—1N1510
Resistor 42—2700 ohms
Capacitor 44—.33 microfarad The circuit is capable of driving 22 micromicrofarads of shunt capacity without any deterioration in bandwidth.

Some of the fundamental advantages in using the circuit described in connection with FIGS. 1 and 2 will be further evident with reference to FIG. 3, which shows the luminance circuit and that portion of the color circuits associated with matrixing and amplification in the video color output.

As in a conventional receiver the output of the second detector, which is the detected video signal, is A.C. coupled to one gate electrode of a dual gate field effect transistor 50 of the MOS type via a capacitor 51. Also shown coupled between this gate electrode and ground is an input resistor 59 selected to provide an impedance match to the second detector. The dual gate MOS F.E.T. 50 is used as the video amplifier stage. Such a dual gate F.E.T. has a higher transconductance than a single gate unit, allowing it to supply more signal to the delay line 52. In addition the functions of brightness, contrast and signal amplification can be accomplished on separate electrodes without interactions. Hence as seen in FIG. 3, contrast control is obtained by using a potentiometer 53 in series with a source resistor 54. The potentiometer 53 and the source resistor 54 provide a degenerative current feedback path between ground and the source electrode of the F.E.T. 50. By varying the potentiometer 53 one can introduce more or less resistive feedback and hence control the gain of the video amplifier, using the F.E.T. 20, and thereby provide contrast control. Brightness variation is afforded by coupling the second gate electrode of the F.E.T. 50 to a bias control circuit, comprising capacitor 55, resistor 56 and the variable resistor 57. The bias voltage applied to the second gate electrode is obtained from a positive source $+V_a$ coupled to the junction of variable resistor 57 and resistor 56. The other terminal of variable resistor 57 is returned to a tap on the horizontal transformer which supplies a negative pulse used to "stretch" the amplitude of the horizontal pedestal during the retrace interval, which in gated restoration of the D.C. becomes the brightness control. The drain electrode of the F.E.T. 50 is coupled to $+V_a$ through a load resistor 60 and a parallel tank circuit comprising a variable capacitor 62 and an inductor 63. The parallel tank circuit is used for video peaking to enable the amplifier to respond to the wideband video signal by compensating for the adverse effects of stray capacity. Furthermore the composite network comprising resistors 60 and 64, inductor 63 and capacitor 62 serve as a delay line matching and frequency filtering network for proper bandwidth and phase response characteristics. One terminal of the tank circuit is coupled to a terminal of a capacitor 66 whose other terminal is coupled to the delay line 52. In this manner the nearly constant output impedance characteristic of the dual gate MOS F.E.T. circuit used to drive the delay line 52 and hence prevent reflections therefrom from disturbing circuit operation and picture quality. The delay line 52 is coupled to one terminal of an inductor 70 whose other terminal is coupled to a terminal of a resistor 73, whose other terminal is returned to ground. The inductor 70 and resistor 73 form an impedance matching network for the delay line 52. The common terminal or output terminal of inductor 70 and resistor 73 is coupled directly to the gate electrodes of three field effect transistors 75, 76 and 77 respectively, which transistors are designated as Y drivers and serve to amplify and further couple the video signal. The term Y being used to refer to the so called monochrome or luminance signal. It is noted that due to the large input impedances of the F.E.T. Y drivers 75 to 77, the delay line is coupled directly through the impedance matching network without the need of a separate amplifier or emitter follower circuit therebetween. Each Y driver has a drain or load resistor coupled between its drain electrode and a point of reference potential as $+V_{cc}$; these resistors are respectively designated as 78, 79 and 80 for the F.E.T.'s 75 to 77. The source electrodes of the F.E.T.'s 75 to 77 are coupled to a point of reference potential as ground, in the following manner. The source electrode of F.E.T. 75 is coupled to a terminal of feedback resistor 80 whose other terminal is coupled to a terminal of a resistor 81. The other terminals of resistor 81 are connected to ground thereby providing a return path for current flow through the F.E.T. 75. Resistor 81 is bypassed by a suitable peaking capacitor 82. The source electrode of transistor 76 is coupled to a terminal of a variable resistor 84. There is also shown the source of transistor 77 coupled to a terminal of a variable resistor 86. The other terminals of resistors 84 and 86 are returned to the junction of resistors 80 and 81. In this manner drive control leveling of the luminance or Y signal is accomplished in the source electrodes of the respective luminance of Y drivers which incorporate F.E.T.'s 75–77.

Figure 3:
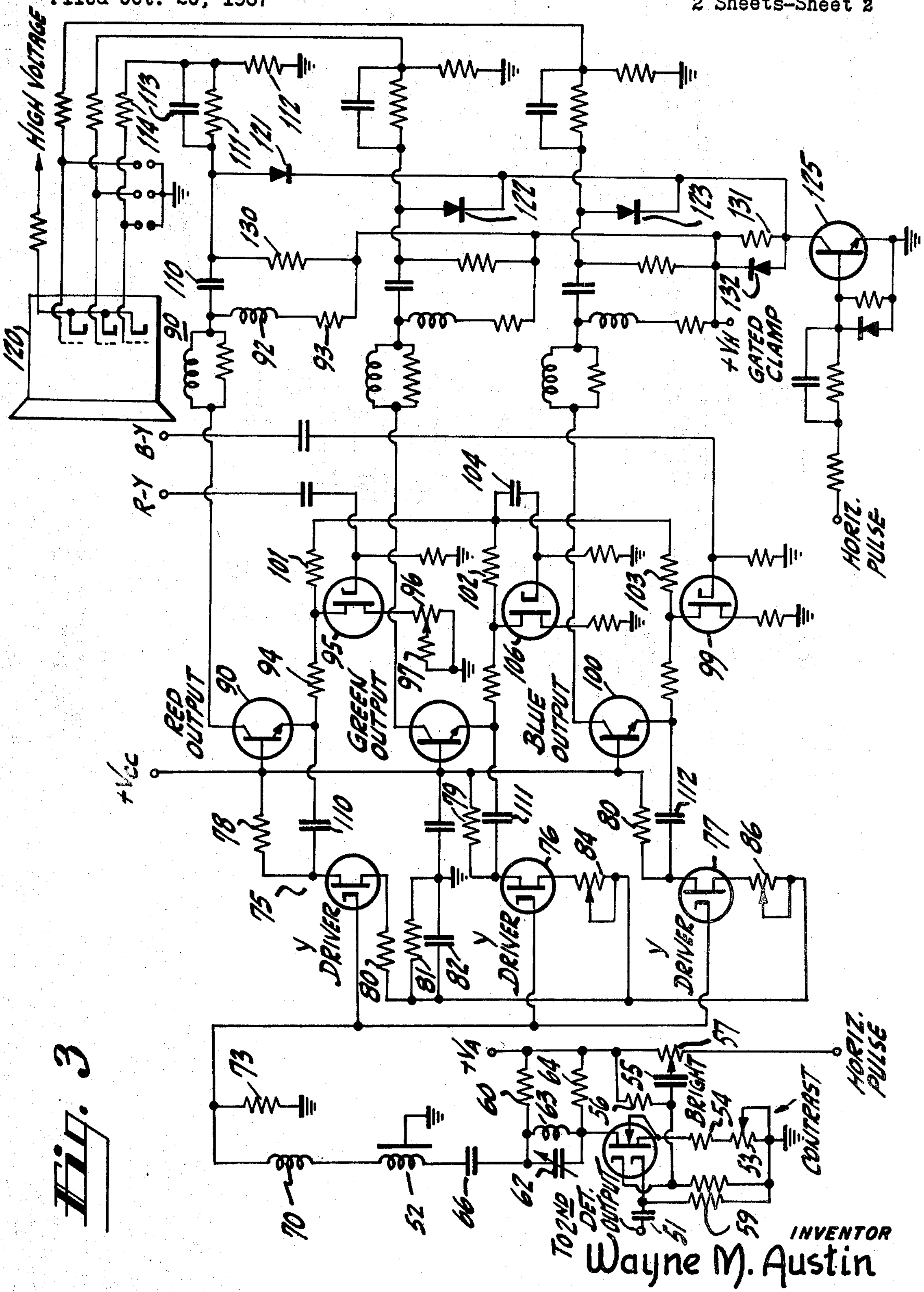
FIG. 3 is a schematic diagram of a video and color matrixing circuit using the current invention.

There is shown in FIG. 3, three output drivers respectively labelled as RED, GREEN and BLUE OUTPUT. Each such stage, as is recognized from the schematic, is the amplifier described in connection with FIGS. 1 and 2. For example the RED output stage consists of a bipolar transistor 90, having a high voltage and dissipation rating, the base electrode of which is returned to $+V_{cc}$ for biasing purposes. The collector electrode of transistor 90 is returned to a high potential source $+V_h$ through a series peaking circuit 91 and a shunt peaking coil 92 in series with a load resistor 93. The emitter electrode of the bipolar 90 is returned through a small series resistor 94 to the drain of a high gain bandwidth, low voltage rated F.E.T. 95. The source electrode of the F.E.T. 95 is coupled through a vairable resistor 96 to ground. The arm of resistor 96 is coupled through a fixed resistor 97 to ground and the combination provides current feedback and hence gain control in a manner known in the art. The gate electrode of the F.E.T. 95 is A.C. coupled to the R–Y or Red–Y signal which is supplied by the R–Y demodulator found in a conventional color receiver.

This gate electrode of F.E.T. 95, of course, offers a high input impedance to the R–Y demodulator and hence the demodulator can be coupled thereto without the need of an additional emitter follower circuit. In a similar manner the output of the B–Y (Blue–Y) demodulator is A.C. coupled to the gate electrode of the F.E.T. 99 which is part of the video amplifier circuit for the BLUE output driver. This BLUE output driver also utilizes a bipolar transistor 100 in the manner previously described with reference to FIGS. 1 and 2. The input to F.E.T. 106 associated with the GREEN OUTPUT driver is obtained by connecting its gate electrode to the junction of the matrixing resistors 101, 102 and 103 respectively via a decoupling capacitor 104. Resistor 101 is coupled to the source electrode of the F.E.T. 95 to provide a R–Y signal for the green output amplifier, while resistor 103 is coupled to the source of F.E.T. 99 to provide a B–Y signal. Resistor 102 feedbacks a suitable amount of G–Y signal to obtain feedback to assure proper matrixing for the green output stage. It is seen that the color difference signals as the R–Y and B–Y signals are mixed with the luminance or Y signals in the emitter circuits of the video output or color driver stages. Hence the luminance signal or Y signal 1 obtained from the Y driver using F.E.T. 75 is A.C. coupled to the emitter of the high voltage bipolar transistor 90 via the capacitor 110. In a similar manner the output of the other Y drivers, using F.E.T.'s 76 and 77, are likewise coupled to the emitter electrodes of the respective bipolar transistors via capacitors 111 and 112. In this manner the luminance or Y drivers are A.C. coupled in to the video output stage while the color difference signal drivers as F.E.T.'s 95, 99 and 106 are D.C. coupled. The D.C. coupling of the difference signal drivers provides control of the D.C. current in the video bipolar output transistors. Hence the circuit described in FIGS. 1 and 2 can further serve to matrix or mix the color difference and luminance signals with the insertion of another A.C. coupled F.E.T. stage. Furthermore, it is seen that the circuit, as shown, possesses all the advantages previously described in connection with FIGS. 1 and 2, while further affording a substantial reduction of components in the luminance portion of the receiver. The biasing arrangements are also somewhat arbitrary as one could A.C. couple the difference signals and direct couple the luminance signals without substantially affecting circuit operation.

Because of the unique bandwidth-voltage sharing action of the bipolar and the F.E.T. transistors, in the circuits described, the color kinescope can be directly driven from the output of the bipolar transistor collector electrode. For example, the output of the RED OUTPUT amplifier taken at the junction of the series peaking network 90 with the shunt peaking coil 91 is coupled through a capacitor 110 to a partial D.C. decoupling network comprising resistor 111, 112 and capacitor 113. The network is so termed as it affords a voltage divider for D.C. while permitting the full A.C. signal to be coupled to the grid circuit of the kinescope 120. The output of the decoupling network is coupled to the red grid electrode of the kinescope 120 through a current limiting resistor 114. It is evident from FIG. 3 that the green and blue grids of the kinescope 120 are driven in a similar manner by their associated video circuits.

It is also interesting to note that a keyed clamp form of D.C. restoration is used to reset a desired level of D.C. in the luminance signal and to provide a common reference that will reset the color D.C. levels at the respective green, red and blue grids of the picture tube 120. Hence there is shown a gated clamp circuit comprising a transistor 125 having its emitter returned to ground and its base circuit responsive to a positive horizontal pulse obtained from a suitable tap on the horizontal transformer of the receiver. The collector of the clamp transistor is coupled to the cathodes of three clamp diodes 121, 122 and 123 for the red, green and blue grids of the kinescope 120 respectively. The anodes of diodes 121 to 123 are coupled to the input of a respective decoupling network associated with each color grid. Therefore the anode of diode 120 is coupled to the input to the decoupling network for the red grid or to the input terminal of resistor 119. This junction point is also coupled to a terminal of a large resistor 130 whose other terminal is coupled to $+V_h$ or the high potential source. The collector of the gated clamp transistor 125 is coupled to the $+V_h$ source through a load resistor 131 in shunt with a diode 132. Diode 132 is included to provide protection against picture tube arcing from affecting the video and clamp transistors. The clamp transistor 125 is gated or keyed on during the horizontal retrace interval by the positive pulse applied to its base. Hence the red, green and blue grids of the kinescope 120 are clamped to ground during this retrace interval by the action of diodes 121 to 123 whose cathodes are coupled to the collector of transistor 125. The collector of the gated clamp transistor 125 is at $+V_h$ or the high voltage potential during horizontal scan and hence the diodes 121 to 123 are reversed biased during the horizontal scan mode. In this manner each horizontal line is reset to ground by the gated clamp transistor 125, thereby obtaining desired operation and proper picture reproduction.

FIG. 3 shows one way to apply the high level video amplifier circuit described in FIGS. 1 and 2. In certain applications it may be desirable to mix the color and luminance signals in the grid and cathode of the picture tube, and in this case one could utilize four separate picture tube driver amplifiers of the type shown in FIGS. 1 and 2. By doing this the requirements of these amplifiers would be reduced in frequency and dissipation but not in voltage swing, therefore still requiring the performance capabilities of this invention.

What is claimed is:

1. Apparatus for amplifying signals to a level capable of operating a signal utilization device requiring a maximum signal input voltage swing of a given magnitude comprising, (a) a first transistor having a base, emitter and collector electrode, said first transistor further having a breakdown voltage rating of a magnitude exceeding said given magnitude of said voltage swing, (b) a field effect transistor having a gate, source and drain electrode, said field effect transistor having a breakdown voltage rating of a magnitude appreciably smaller than said given magnitude of said voltage swing and further having a high gain bandwidth product when compared with the gain bandwidth product rating of said first transistor.

(c) a first direct current conductive coupling between the emitter of said first transistor and the drain of said field effect transistor, (d) a supply of operating potential of a magnitude exceeding said given magnitude of required voltage swing, (e) means, including a load, for coupling said collector of said first transistor and said source electrode of said field effect transistor to form therewith a series path whereby said emitter-collector path of said first transistor and said source drain path of said field effect transistor are in series with said supply, (f) means for applying first signals to said gate electrode of said field effect transistor, (g) means for applying second signals to said emitter electrode of said first transistor, (h) means for applying signals developed across said load due to said first and second signals to said signal utilization device.

2. In a color television receiver including a luminance signal path, a color difference signal path and a color kinescope having an input electrode, a color signal channel comprising, (a) a high voltage transistor having base, emitter and collector electrodes, (b) a pair of low voltage field effect transistors, each having a gate, source and drain electrodes, (c) means for applying signals from said luminance signal source to the gate of one of said pair of field effect transistors, (d) means for applying signals from said color difference signal source to the gate of the other of said pair of field effect transistors, (e) means for providing a direct current conductive connection between the drain electrode of said other of said pair of field effect transistors and the emitter of said high voltage transistor, (f) means for providing an alternating current conductive path between the drain electrode of said one of said pair of field effect transistors and the emitter of said high voltage transistor, (g) means for maintaining the base of said high voltage transistor at a relatively low unidirectional potential, (h) means for applying a relatively high unidirectional operating potential to said collector of said high voltage transistor, and (i) means for applying signals appearing at the collector of said high voltage transistor to said input electrode of said color kinescope.

3. In a color television receiver including a luminance signal source, three color difference signal sources and a color kinescope having a green, red and blue input electrode, a trio of color signal channels each comprising, (a) a high voltage transistor having a base, emitter and collector electrode, (b) a pair of low voltage field effect transistors, each having a gate, source and drain electrode, (c) means for applying signals from said luminance signal source to the gate electrode of one of said pair of field effect transistors, (d) means for applying signals from a respective one of said three color difference signal sources to the gate electrode of said other of said pair of field effect transistors, (e) means for providing respective direct current conductive connections between the drain of one of said pair of field effect transistors and the emitter of said high voltage transistor, (f) means for providing alternating current conductive connections between the drain of said other one of said pair of field effect transistors and the emitter of said high voltage transistor, (g) means for maintaining the base of said high voltage transistor at a relatively low unidirectional voltage, (h) means for applying a relatively high unidirectional operating potential to said collector of said high voltage transistor, and (i) means for applying signals appearing at the collector of said high voltage transistor to a respective one of said green, red and blue input electrodes of said color kinescope.

4. In a television receiver using a three input color kinescope the combination therewith comprising, (a) a first video field effect transistor amplifier having a gate input electrode and an output electrode, (b) means coupled to said gate electrode for applying specified first video signals thereto, (c) second, third and fourth video field effect transistor amplifiers each having a gate input electrode and an output electrode, (d) means for coupling said first video amplifiers output electrode to said gate input electrodes of said second, third and fourth field effect transistor amplifiers, (e) fifth, sixth and seventh high level video amplifiers each having two input terminals and one output electrode, (f) means for capacitively coupling said second video field effect transistor amplifiers output electrode to one input terminal of said fifth high level video amplifier, (g) means for capacitively coupling said third video field effect transistor amplifiers output electrode to one input terminal of said sixth high level video amplifier, (h) means for capacitively coupling said fourth video field effect transistor's amplifier output electrode to one input terminal of said seventh high level video amplifier, (i) means for applying second video signals different from said first video signals to said other input of said fifth, sixth and seventh high level video amplifiers in a manner to effectively combine said first and second video signals at said output terminals of said high level video amplifiers, and (j) means for applying said combined signals at said output terminals of said fifth, sixth and seventh high level video amplifiers to a different respective one of said color kinescope inputs.

5. A high voltage swing, large bandwidth video amplifier for use in a television receiver, comprising, (a) a high voltage, large dissipation rated transistor having a base, emitter and collector electrodes, (b) a substantially lower voltage, lower dissipation rated field effect transistor having a relatively large gain-bandwidth product when compared to that of said high voltage, large dissipation rated transistor and further having a gate, source and drain electrode, (c) a shunt network, having a given resonant frequency, coupled between said first transistor's emitter and said field effect transistor's drain electrode, (d) a potential source of a unidirectional characteristic whose magnitude exceeds said high voltage swing, said potential source having first and second terminals, (e) means, including a load resistor, for coupling said first terminal of said potential source to said large dissipation rated transistor's collector electrode and a connection between said second terminal of said potential source and said field effect transistor's source electrode, said large dissipation transistor collector-emitter path and said drain-source path of said field effect device forming a series network between said first and second terminals, (f) means coupled to said field effect's gate electrode for applying a standard composite video signal thereto, to cause high voltage video signal swings to appear across said load, while further serving to cause signals at said given frequency present in said composite video signal to appear at said drain electrode of said field effect transistor due to the action of said shunt network.

6. The amplifier according to claim 5 wherein said field effect transistor is a metal on silicon device (MOS).

References Cited

UNITED STATES PATENTS

| | | | |
|---|---|---|---|
| 3,286,189 | 11/1966 | Mitchell et al. ------ | 330—24 |
| 3,383,615 | 5/1968 | Milberger et al. ------ | 330—24 |

RICHARD MURRAY, Primary Examiner

J. C. MARTIN, Assistant Examiner

U.S. Cl. X.R.

330—24;178—7.3